US010268415B2

United States Patent
Kanno et al.

(10) Patent No.: US 10,268,415 B2
(45) Date of Patent: Apr. 23, 2019

(54) DATA STORAGE DEVICE INCLUDING A FIRST STORAGE UNIT AND A SECOND STORAGE UNIT AND DATA STORAGE CONTROL METHOD THEREOF

(71) Applicant: KABUSHIKI KAISHA TOSHIBA, Minato-ku (JP)

(72) Inventors: Shinichi Kanno, Tokyo (JP); Kazuhiro Fukutomi, Kanagawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 273 days.

(21) Appl. No.: 15/223,347

(22) Filed: Jul. 29, 2016

(65) Prior Publication Data
US 2016/0335026 A1    Nov. 17, 2016

Related U.S. Application Data

(62) Division of application No. 14/021,032, filed on Sep. 9, 2013.

(30) Foreign Application Priority Data

Jun. 5, 2013    (JP) ................................. 2013-118505

(51) Int. Cl.
*G06F 12/00* (2006.01)
*G06F 3/06* (2006.01)
(Continued)

(52) U.S. Cl.
CPC .......... *G06F 3/0647* (2013.01); *G06F 3/0619* (2013.01); *G06F 3/0685* (2013.01);
(Continued)

(58) Field of Classification Search
None
See application file for complete search history.

(56) References Cited

U.S. PATENT DOCUMENTS

| 8,775,720 B1 | 7/2014 | Meyer et al. |
| 2007/0005889 A1* | 1/2007 | Matthews ........... G06F 12/0888 711/118 |

(Continued)

FOREIGN PATENT DOCUMENTS

| JP | 6-195265 A | 7/1994 |
| JP | 11-224164 A | 8/1999 |

(Continued)

OTHER PUBLICATIONS

Office Action dated Jul. 26, 2016 in Japanese Patent Application No. 2013-118505 (with English language translation).

*Primary Examiner* — Daniel D Tsui
(74) *Attorney, Agent, or Firm* — Oblon, McClelland, Maier & Neustadt, L.L.P.

(57) ABSTRACT

According to one embodiment, a data storage device includes a first storage unit, a second storage unit, a first queue, a second queue, and a distributor. The second storage unit is used as a cache of the first storage unit and has a lower write transfer rate and a faster response time than the first storage unit. The first queue corresponds to the first storage unit. The second queue corresponds to the second storage unit. The distributor distributes a write command received presently from a host to one of the first and second queues in which the number of write commands registered presently is smaller.

9 Claims, 8 Drawing Sheets

(51) Int. Cl.
*G06F 12/0871* (2016.01)
*G11B 5/54* (2006.01)

(52) U.S. Cl.
CPC ........... *G06F 12/0871* (2013.01); *G11B 5/54* (2013.01); *G06F 2212/222* (2013.01); *G06F 2212/313* (2013.01); *G06F 2212/502* (2013.01)

(56) References Cited

U.S. PATENT DOCUMENTS

| | | | |
|---|---|---|---|
| 2007/0033362 A1 | 2/2007 | Sinclair | |
| 2009/0193182 A1 | 7/2009 | Nitta | |
| 2011/0246706 A1 | 10/2011 | Gomyo et al. | |
| 2012/0017043 A1 | 1/2012 | Aizman et al. | |
| 2012/0166749 A1 | 6/2012 | Eleftheriou et al. | |
| 2013/0159597 A1 | 6/2013 | Chong | |
| 2013/0346688 A1* | 12/2013 | Hayakawa | G06F 3/0611 711/113 |
| 2014/0082263 A1 | 3/2014 | Iwasa et al. | |

FOREIGN PATENT DOCUMENTS

| | | |
|---|---|---|
| JP | 2009-503731 | 1/2009 |
| JP | 2009-181314 | 8/2009 |
| JP | 2010-176305 | 8/2010 |
| JP | 2011-209973 A | 10/2011 |
| JP | 2012-221038 A | 11/2012 |
| WO | WO 2007/019076 A2 | 2/2007 |

\* cited by examiner

FIG.3
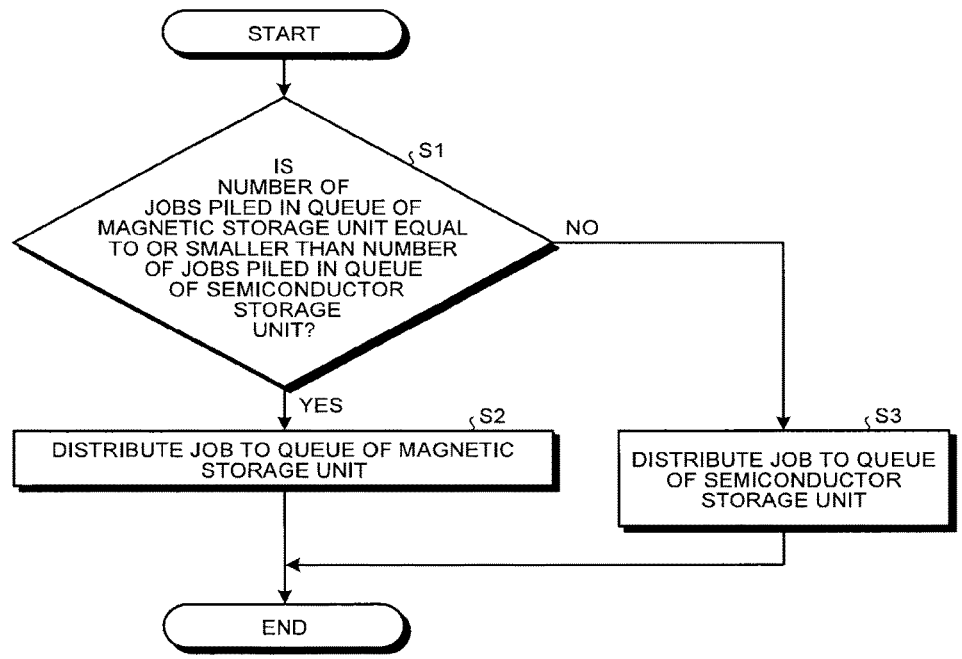
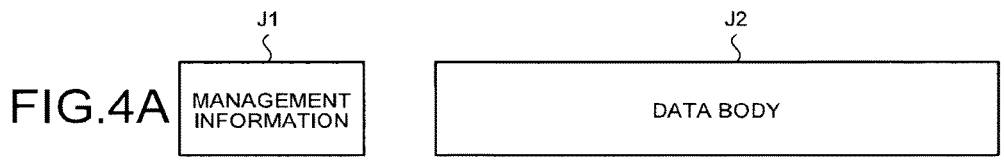
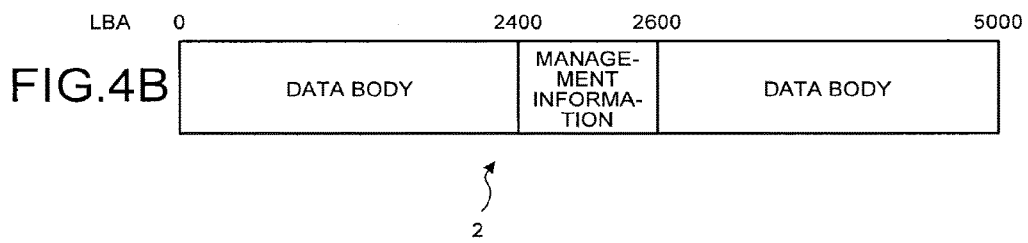

FIG.6

WRITE DATA FROM HOST TO MAGNETIC STORAGE UNIT ↓

| LBA | FPB | DIRTY FLAG | NUMBER OF ACCESSES |
|---|---|---|---|
| X1 | NOT DESIGNATED | 0 | 0 |
|  |  |  |  |
| ⋮ | ⋮ | ⋮ | ⋮ |

↓ READ TWICE FROM MAGNETIC STORAGE UNIT

| LBA | FPB | DIRTY FLAG | NUMBER OF ACCESSES |
|---|---|---|---|
| X1 | NOT DESIGNATED | 0 | 2 |
|  |  |  |  |
| ⋮ | ⋮ | ⋮ | ⋮ |

↓ WRITE DATA TO SEMICONDUCTOR STORAGE UNIT

| LBA | FPB | DIRTY FLAG | NUMBER OF ACCESSES |
|---|---|---|---|
| X1 | Y1 | 0 | 2 |
|  |  |  |  |
| ⋮ | ⋮ | ⋮ | ⋮ |

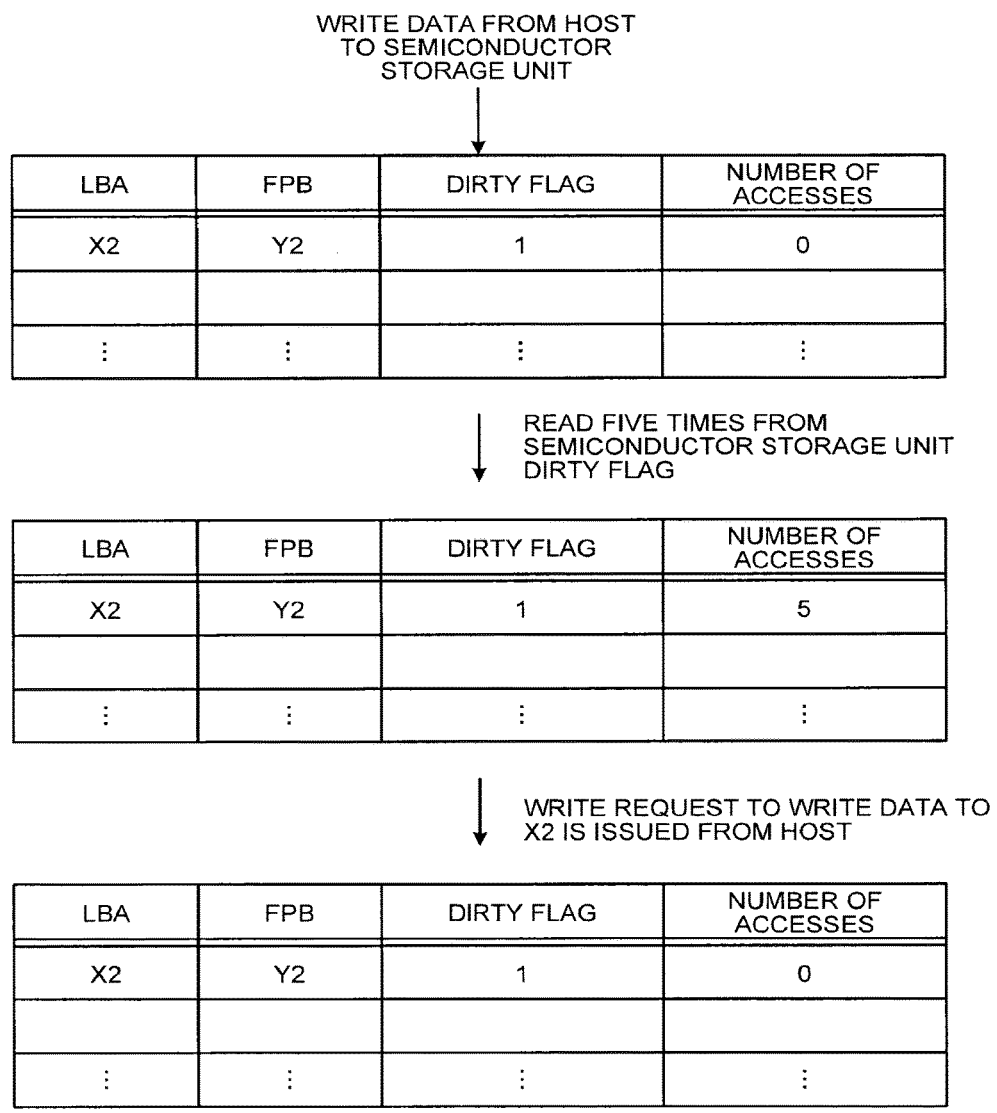

FIG.8B

| LBA | FPB | DIRTY FLAG | NUMBER OF ACCESSES |
|---|---|---|---|
| X6 | NOT DESIGNATED | 0 | 0 |
| | | | |
| ⋮ | ⋮ | ⋮ | ⋮ |

| LBA | FPB | DIRTY FLAG | NUMBER OF ACCESSES |
|---|---|---|---|
| X6 | NOT DESIGNATED | 0 | 1 |
| | | | |
| ⋮ | ⋮ | ⋮ | ⋮ |

| LBA | FPB | DIRTY FLAG | NUMBER OF ACCESSES |
|---|---|---|---|
| X7 | NOT DESIGNATED | 0 | 0 |
| | | | |
| ⋮ | ⋮ | ⋮ | ⋮ |

FIG.8D

| LBA | FPB | DIRTY FLAG | NUMBER OF ACCESSES |
|---|---|---|---|
| X7 | Y7 | 0 | 1 |
| | | | |
| ⋮ | ⋮ | ⋮ | ⋮ |

| LBA | FPB | DIRTY FLAG | NUMBER OF ACCESSES |
|---|---|---|---|
| X8 | NOT DESIGNATED | 0 | 5 |
|  |  |  |  |
| ⋮ | ⋮ | ⋮ | ⋮ |

| LBA | FPB | DIRTY FLAG | NUMBER OF ACCESSES |
|---|---|---|---|
| X8 | Y8 | 0 | 5 |
|  |  |  |  |
| ⋮ | ⋮ | ⋮ | ⋮ |

US 10,268,415 B2

DATA STORAGE DEVICE INCLUDING A FIRST STORAGE UNIT AND A SECOND STORAGE UNIT AND DATA STORAGE CONTROL METHOD THEREOF

CROSS-REFERENCE TO RELATED APPLICATIONS

This application is a divisional of U.S. application Ser. No. 14/021,032, filed Sep. 9, 2013. U.S. application Ser. No. 14/021,032 is based upon and claims the benefit of priority from Japanese Patent Application No. 2013-118505, filed on Jun. 5, 2013; the entire contents of each of which are incorporated herein by reference.

FIELD

Embodiments described herein relate generally to a data storage device and a data storage control method.

BACKGROUND

In order to realize both large data capacity and fast data access, a hybrid drive that uses a semiconductor storage medium such as a NAND-type flash memory as a cache of a storage such as a hard disk drive (HDD) is known.

BRIEF DESCRIPTION OF THE DRAWINGS

FIG. 3 is a flowchart illustrating the queuing method of the data storage device according to the first embodiment;

FIG. 4A is a diagram illustrating a relationship between management information and data designated by a write command in a data storage device according to a second embodiment, and FIG. 4B is a diagram illustrating storage locations designated by the LBAs of the management information and the data of FIG. 4A;

FIG. 6 is a diagram illustrating a method of updating a cache management table in a data storage device according to a third embodiment;

FIG. 7 is a diagram illustrating a method of updating a cache management table in a data storage device according to a fourth embodiment;

FIGS. 8B and 8D are diagrams illustrating a method of updating a cache management table corresponding to the processes of FIGS. 8A and 8C.

DETAILED DESCRIPTION

In general, according to one embodiment, a data storage device includes a first storage unit, a second storage unit, a first queue, a second queue, and a distributor. The second storage unit is used as a cache of the first storage unit and has a lower write transfer rate and a faster response time than the first storage unit. The first queue corresponds to the first storage unit. The second queue corresponds to the second storage unit. The distributor distributes a write command received presently from a host to one of the first and second queues in which the number of write commands registered presently is smaller.

Hereinafter, a data storage device according to embodiments will be described in detail with reference to the accompanying drawings. It should be noted that the present invention is not limited to these embodiments.

First Embodiment

Figure 1:
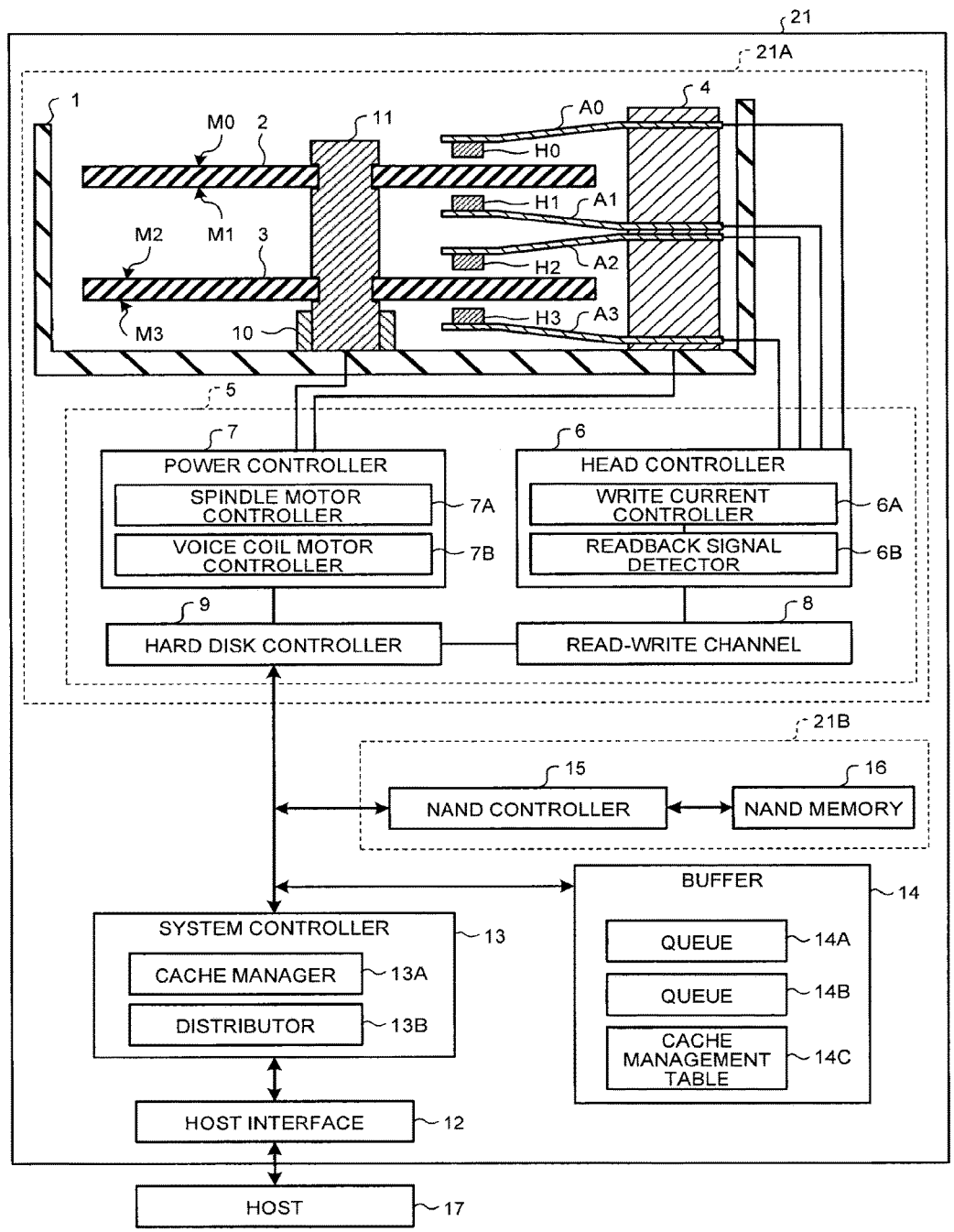
FIG. 1 is a block diagram illustrating an overall configuration of a data storage device according to a first embodiment.

FIG. 1 is a block diagram illustrating an overall configuration of a data storage device according to a first embodiment.

In FIG. 1, a data storage device 21 includes a magnetic storage unit 21A, a semiconductor storage unit 21B, a host interface 12, a system controller 13, and a buffer 14. The semiconductor storage unit 21B has a lower write transfer rate and a faster response time than the magnetic storage unit 21A. For example, the write transfer rate of the magnetic storage unit 21A can be set to 100 MB/sec and the response time (seek time) can be set to 2 msec to 30 msec. The write transfer rate of the semiconductor storage unit 21B can be set to 40 MB/sec and the response time can be set to 300 μsec to 500 μsec.

A plurality of magnetic disks 2 and 3 is provided in the magnetic storage unit 21A, disk surfaces M0 and M1 are provided on both surfaces of a magnetic disk 2, and disk surfaces M2 and M3 are provided on both surfaces of the magnetic disk 3. The magnetic disks 2 and 3 are integrally supported by a spindle 11.

Moreover, in the magnetic storage unit 21A, magnetic heads H0 to H3 are provided to the respective disk surfaces M0 to M3, and the magnetic heads H0 to H3 are disposed so as to face the disk surfaces M0 to M3, respectively. Here, the magnetic heads H0 to H3 are held on the disk surfaces M0 to M3 by arms A0 to A3, respectively. The arms A0 to A3 can allow the magnetic heads H0 to H3 to slide within a horizontal surface.

A voice coil motor 4 that drives the arms A0 to A3 is provided in the magnetic storage unit 21A, and a spindle motor 10 that rotates the magnetic disks 2 and 3 through the spindle 11 is provided. The magnetic disks 2 and 3, the magnetic heads H0 to H3, the arms A0 to A3, the voice coil motor 4, the spindle motor 10, and the spindle 11 are accommodated in a case 1.

In addition, a magnetic recording controller 5 is provided in the magnetic storage unit 21A, a head controller 6, a power controller 7, a read-write channel 8, and a hard disk controller 9 are provided in the magnetic recording controller 5. A write current controller 6A and a readback signal detector 6B are provided in the head controller 6. A spindle motor controller 7A and a voice coil motor controller 7B are provided in the power controller 7.

The head controller 6 amplifies signals during recording and reading. The write current controller 6A controls a write current flowing in the magnetic heads H0 to H3. The readback signal detector 6B detects signals detected by the magnetic heads H0 to H3. The power controller 7 drives the voice coil motor 4 and the spindle motor 10. The spindle motor controller 7A controls rotation of the spindle motor 10. The voice coil motor controller 7B controls driving of the voice coil motor 4. The read-write channel 8 converts signals read by the magnetic heads H0 to H3 into a data format handled by a host 17 and converts data output from the host 17 into a signal format recorded by the magnetic heads H0 to H3. Examples of such format conversion include DA conversion and encoding. Moreover, the read-write channel 8 decodes signals read by the magnetic heads H0 to H3 and modulates data codes output from the host 17. The hard disk controller 9 can control recording and reading based on a command from the system controller 13 and exchange data between the system controller 13 and the read-write channel 8.

A NAND controller 15 and a NAND memory 16 are provided in the semiconductor storage unit 21B. The NAND memory 16 caches data written to the magnetic disks 2 and 3. The NAND controller 15 can control the NAND memory 16. Examples of the control of the NAND memory 16 include control of reading and writing of the NAND memory 16, block selection, error correction, and the like.

The host interface 12 can receive a write command and a read command from the host 17 and output read data read from the magnetic disks 2 and 3 or the NAND memory 16 to the host 17. The host interface 12 is connected to the host 17. The host 17 may be a personal computer that outputs a write command and a read command to the data storage device 21 and may be an external interface.

The system controller 13 can send a command for reading and writing data from and to the magnetic disks 2 and 3 to the hard disk controller 9 and send a command for reading and writing data from and to the NAND memory 16 to the NAND controller 15. The system controller 13, the host interface 12, the read-write channel 8, the NAND controller 15, and a CPU (not illustrated) can be configured as a system on-chip (SoC), for example. The process of the system controller 13 can be controlled by firmware executed by a CPU (not illustrated). A cache manager 13A and a distributor 13B can be provided in the system controller 13. The cache manager 13A can manage a cache management table 14C. The distributor 13B can distribute a write command received from the host 17 to a queue 14A or 14B.

The buffer 14 can transfer read data read from the NAND memory 16 to the system controller 13 and receive write data written to the NAND memory 16 from the system controller 13. The buffer 14 may be DRAM or SRAM. The queues 14A and 14B and the cache management table 14C can be provided in the buffer 14. The queue 14A is provided so as to correspond to the magnetic storage unit 21A and can hold a job for the magnetic storage unit 21A. The queue 14B is provided so as to correspond to the semiconductor storage unit 21B and can hold a job for the semiconductor storage unit 21B. As the job, a write command received from the host 17 can be held. The cache management table 14C can register a correspondence between a logical block address LBA of data stored in the magnetic storage unit 21A or the semiconductor storage unit 21B and a storage address FPB of the semiconductor storage unit 21B and register a dirty flag and the number of accesses for each LBA.

When data is read and written from and to the magnetic disks 2 and 3, the magnetic disks 2 and 3 are rotated by the spindle motor 10, and signals are read from the disk surfaces M0 to M3 by the magnetic heads H0 to H3, respectively, and are detected by the readback signal detector 6B. The signals detected by the readback signal detector 6B are converted into data by the read-write channel 8 and are sent to the hard disk controller 9. Moreover, the hard disk controller 9 performs tracking control of the magnetic heads H0 to H3 based on a burst pattern included in the signals detected by the readback signal detector 6B. Further, the present positions of the magnetic heads H0 to H3 are calculated based on sector/cylinder information included in the signals detected by the readback signal detector 6B, and seek control is performed so that the magnetic heads H0 to H3 approach target positions.

On the other hand, when data is written using the NAND memory 16 as a write cache, the system controller 13 temporarily stores write data supplied from the host 17 in the buffer 14. Moreover, the NAND controller 15 transfers write data stored in the buffer 14 to the NAND memory 16 and writes the write data to the NAND memory 16. When data is written to the NAND memory 16 as a write cache, the system controller 13 may exchange the write data supplied from the host 17 with the NAND controller 15 without temporarily storing the same in the buffer 14, and the NAND controller 15 may write the write data to the NAND memory 16.

In addition, when data is read using the NAND memory 16 as a read cache, the NAND controller 15 reads read data from the NAND memory 16 and temporarily stores the same in the buffer 14. Moreover, the system controller 13 transfers the read data stored in the buffer 14 to the host 17. When data is read using the NAND memory 16 as a read cache, the NAND controller 15 may exchange the read data read from the NAND memory 16 with the system controller 13 without temporarily storing the same in the buffer 14, and the system controller 13 may transfer the read data to the host 17.

Here, upon receiving a write command from the host 17, the system controller 13 determines whether write data designated by the write command will be cached in the NAND memory 16. When the write data is to be cached in the NAND memory 16, the system controller 13 instructs the NAND controller 15 to record the write data in the NAND memory 16. On the other hand, when the write data is not to be cached in the NAND memory 16, the system controller 13 instructs the hard disk controller 9 to record the write data on the magnetic disks 2 and 3.

On the other hand, upon receiving a read command from the host 17, the system controller 13 determines whether read data designated by the read command is cached in the NAND memory 16. When the read data is cached in the NAND memory 16, the system controller 13 instructs the NAND controller 15 to read the read data from the NAND memory 16. On the other hand, when the read data is not cached in the NAND memory 16, the system controller 13 instructs the hard disk controller 9 to read the read data from the magnetic disks 2 and 3.

Here, the distributor 13B can distribute a write command received presently from the host 17 to one of the queues 14A and 14B in which the number of write commands registered presently is smaller.

FIGS. 2A to 2G are block diagrams illustrating a queuing method of the data storage device according to the first embodiment.

Figure 2A:
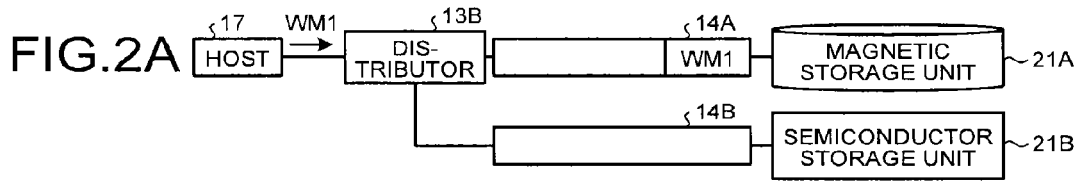
FIGS. 2A to 2G are block diagrams illustrating a queuing method of the data storage device according to the first embodiment.

In FIG. 2A, it is assumed that a write command WM1 is sent from the host 17 to the data storage device 21. It is also assumed that X1 is included in the write command WM1 as an LBA and L1 is included as the length of data specified by the write command WM1. In this case, if the queues 14A and 14B are empty, the distributor 13B distributes the write command WM1 to the queue 14A.

Figure 2B:
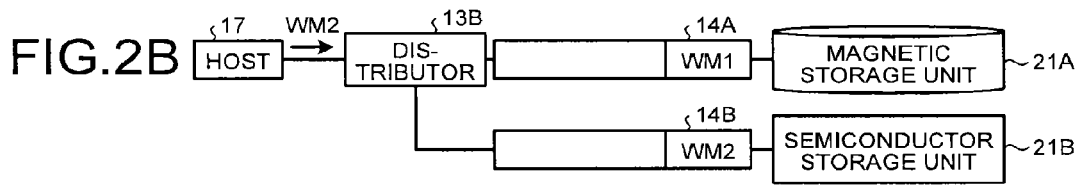

Next, in FIG. 2B, it is assumed that a write command WM2 is sent from the host 17 to the data storage device 21. It is also assumed that X2 is included in the write command WM2 as an LBA and L2 is included as the length of data specified by the write command WM2. In this case, the write command WM1 is registered in the queue 14A. Thus, since the number of write commands registered presently in the queue 14B is smaller than that of the queue 14A, the distributor 13B distributes the write command WM2 to the queue 14B.

Figure 2C:
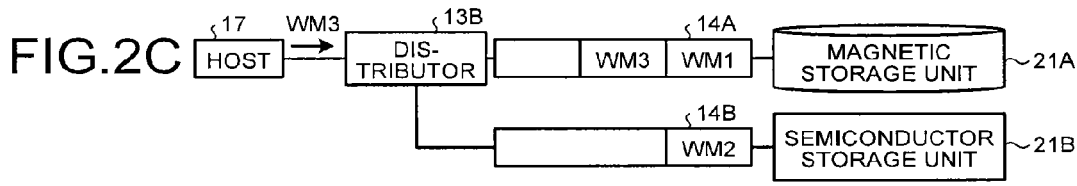

Next, in FIG. 2C, it is assumed that a write command WM3 is sent from the host 17 to the data storage device 21. It is also assumed that X3 is included in the write command WM3 as an LBA and L3 is included as the length of data specified by the write command WM3. In this case, since the write command WM1 is registered in the queue 14A and the write command WM2 is registered in the queue 14B, the distributor 13B distributes the write command WM3 to the queue 14A.

Figure 2D:
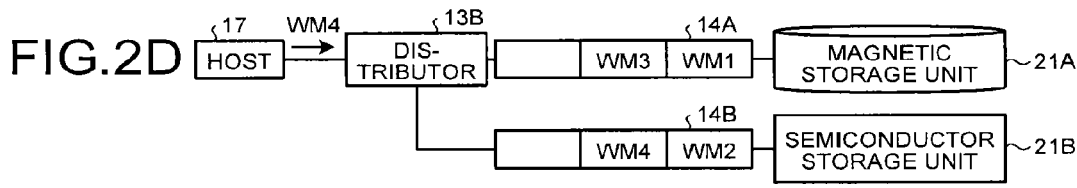

Next, in FIG. 2D, it is assumed that a write command WM4 is sent from the host 17 to the data storage device 21. It is also assumed that X4 is included in the write command WM4 as an LBA and L4 is included as the length of data specified by the write command WM4. In this case, the write commands WM1 and WM3 are registered in the queue 14A, and the write command WM2 is registered in the queue 14B. Thus, since the number of write commands registered presently in the queue 14B is smaller than that of the queue 14A, the distributor 13B distributes the write command WM4 to the queue 14B.

Figure 2E:
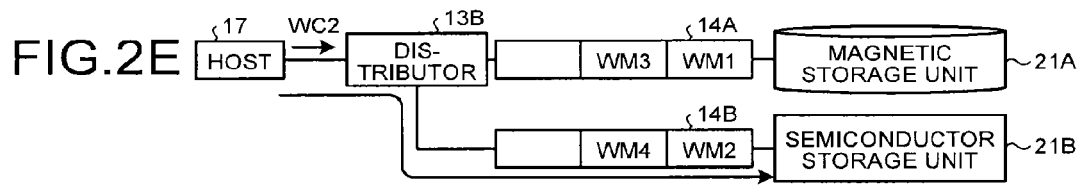
Figure 2F:
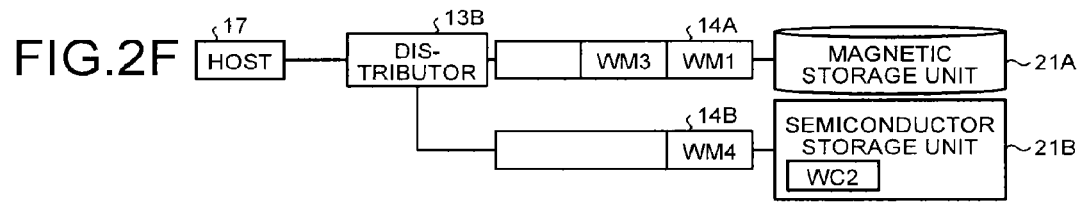

Next, in FIG. 2E, when the data storage device 21 sends a request for data WC2 designated by the write command WM2 to the host 17, the data WC2 is sent from the host 17 to the data storage device 21. Moreover, as illustrated in FIG. 2F, the data WC2 is stored in the semiconductor storage unit 21B and the write command WM2 is deleted from the queue 14B.

Figure 2G:
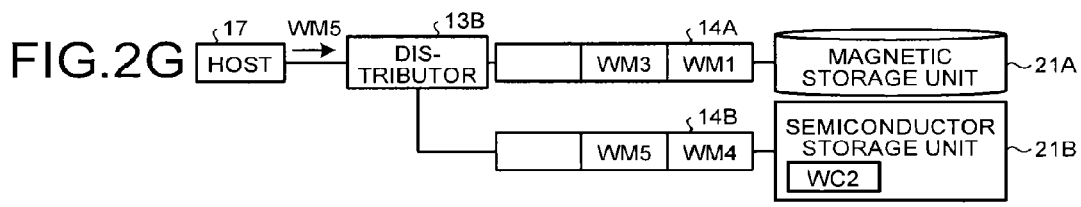

Next, in FIG. 2G, it is assumed that a write command WM5 is sent from the host 17 to the data storage device 21. It is also assumed that X5 is included in the write command WM5 as an LBA and L5 is included as the length of data specified by the write command WM5. In this case, the write commands WM1 and WM3 are registered in the queue 14A, and the write command WM4 is registered in the queue 14B. Thus, since the number of write commands registered presently in the queue 14B is smaller than that of the queue 14A, the distributor 13B distributes the write command WM5 to the queue 14B.

FIG. 3 is a flowchart illustrating a queuing method of the data storage device according to the first embodiment.

In FIG. 3, when a write command is sent from the host 17, the distributor 13B determines whether the number of jobs piled in the queue 14A of the magnetic storage unit 21A is equal to or smaller than the number of jobs piled in the queue 14B of the semiconductor storage unit 21B (S1). Moreover, when the number of jobs piled in the queue 14A of the magnetic storage unit 21A is equal to or smaller than the number of jobs piled in the queue 14B of the semiconductor storage unit 21B (Yes in S1), the distributor 13B distributes a job to the queue 14A of the magnetic storage unit 21A (S2). On the other hand, when the number of jobs piled in the queue 14A of the magnetic storage unit 21A exceeds the number of jobs piled in the queue 14B of the semiconductor storage unit 21B (No in S1), the distributor 13B distributes a job to the queue 14B of the semiconductor storage unit 21B (S3).

Here, by distributing the write command received presently from the host 17 to one of the queues 14A and 14B in which the number of write commands registered presently is smaller, it is possible to decrease the waiting time for performing write-caching to the semiconductor storage unit 21B. Thus, it is possible to improve the response speed to an access request from the host 17 as compared to a method of writing data to the magnetic storage unit 21A after performing write-caching to the semiconductor storage unit 21B. For example, when the write transfer rate of the magnetic storage unit 21A is 100 MB/sec and the write transfer rate of the semiconductor storage unit 21B is 40 MB/sec, the response speed to an access request from the host 17 is 40 MB/sec for the method of writing data to the magnetic storage unit 21A after performing write-caching to the semiconductor storage unit 21B. That is, this response speed corresponds to the write transfer rate of the semiconductor storage unit 21B. In contrast, for the method of distributing the write command received presently from the host 17 to one of the queues 14A and 14B in which the number of write commands registered presently is smaller, the response speed to an access request from the host 17 can be increased to 140 MB/sec. That is, this response speed corresponds to the sum of the write transfer rate of the magnetic storage unit 21A and the write transfer rate of the semiconductor storage unit 21B.

According to the first embodiment, it is possible to reduce the waiting time for performing write-caching to the semiconductor storage unit 21B and to improve the response speed to an access request from the host 17 as compared to a method of writing data to the magnetic storage unit 21A after performing write-caching to the semiconductor storage unit 21B.

Second Embodiment

In FIG. 1, the distributor 13B may distribute a write command having a smaller data length to the queue 14B of the semiconductor storage unit 21B preferentially than a write command having a larger data length. For example, a write command having a data length equal to or smaller than a predetermined value may be distributed to the queue 14B, and a write command having a data length exceeding the predetermined value may be distributed to the queue 14A.

In this manner, in the magnetic storage unit 21A, it is possible to improve efficiency of sequential write and to reduce the seek time. Thus, it is possible to improve the response speed to an access request from the host 17. On the other hand, in the semiconductor storage unit 21B, it is possible to prevent a large volume of data from being stored and to prevent an increase in the capacity of the semiconductor storage unit 21B.

FIG. 4A is a diagram illustrating a relationship between management information and data designated by a write command in the data storage device according to the second embodiment, and FIG. 4B is a diagram illustrating storage locations designated by the LBAs of the management information and the data of FIG. 4A.

In FIG. 4A, a write command can designate management information J1 or a data body J2. Here, the management information J1 includes a storage location of the data body J2. Moreover, the management information J1 generally has a smaller data length than the data body J2.

On the other hand, in FIG. 4B, it is assumed that values 0 to 5000 are allocated to the magnetic disk 2 as LBAs. Here, for example, in the magnetic disk 2, it is assumed that the management information J1 is stored in the location corresponding to the LBAs 2400 to 2600, and the data body J2 is stored in the location corresponding to the LBAs 0 to 2399 and 2601 to 5000.

By distributing a write command having a smaller data length to the queue 14B of the semiconductor storage unit 21B preferentially to a write command having a larger data length, it is possible to improve the frequency in which the data body J2 is stored in the magnetic storage unit 21A while improving the frequency in which the management information J1 is stored in the semiconductor storage unit 21B. Thus, it is possible to efficiently read the management information J1 from the semiconductor storage unit 21B and to increase the frequency in which the magnetic storage unit 21A accesses the data body J2 only. Thus, it is possible to decrease the frequency in which the magnetic storage unit 21A alternately accesses the management information J1 and the data body J2. As a result, it is possible to reduce the seek time in the magnetic storage unit 21A and to efficiently write the data body J2 to the magnetic storage unit 21A. Therefore, it is possible to improve the response speed to an access request from the host 17.

Figure 5:
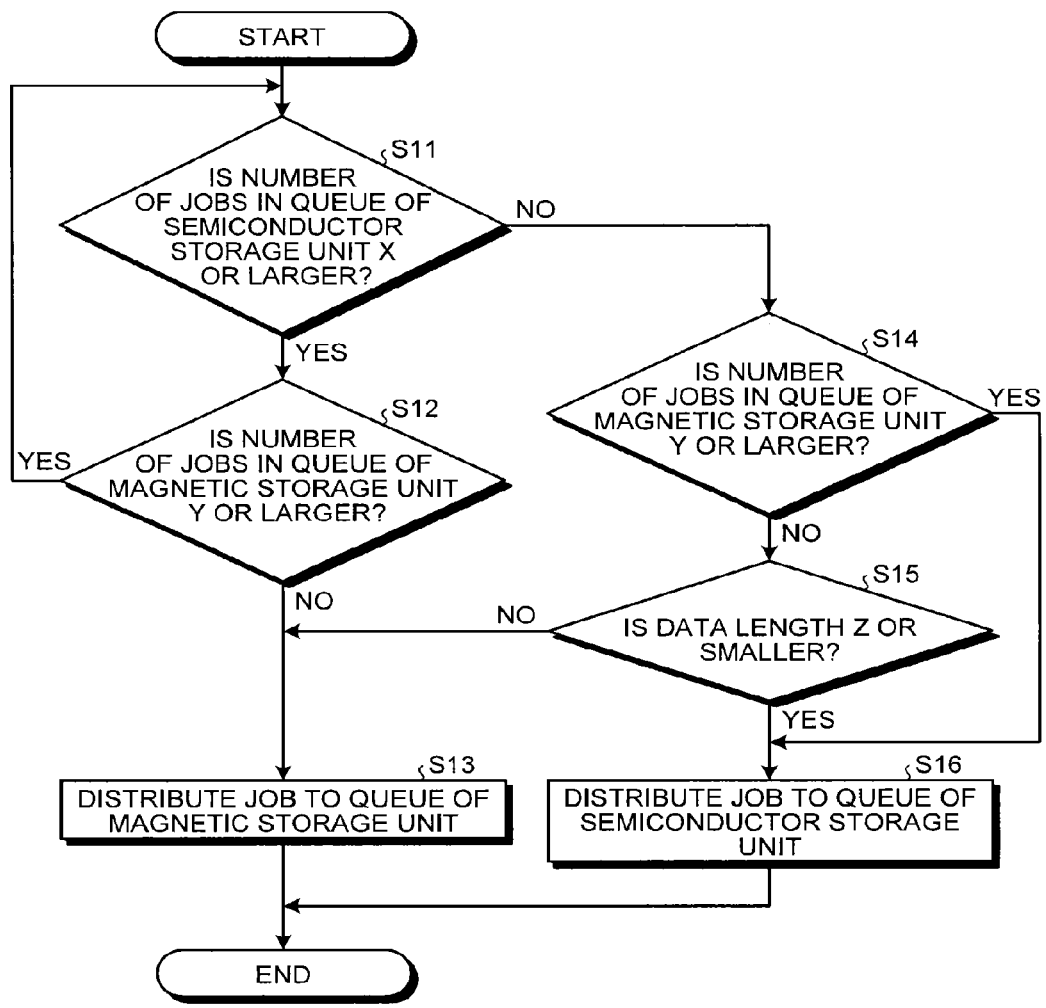
FIG. 5 is a flowchart illustrating a queuing method of the data storage device according to the second embodiment.

FIG. 5 is a flowchart illustrating a queuing method of the data storage device according to the second embodiment.

In FIG. 5, when a write command is received from the host 17, it is determined whether the number of jobs piled in the queue 14B of the semiconductor storage unit 21B is equal to or larger than X (X is a positive integer) (S11). When it is determined in S11 that the number of jobs piled in the queue 14B of the semiconductor storage unit 21B is equal to or larger than X (No in S11), it is determined whether the number of jobs piled in the queue 14A of the magnetic storage unit 21A is equal to or larger than Y (Y is a positive integer) (S12). When it is determined in S12 that the number of jobs piled in the queue 14A of the magnetic storage unit 21A is equal to or larger than Y (Yes in S12), the flow returns to S11. On the other hand, it is determined in S12 that the number of jobs piled in the queue 14A of the magnetic storage unit 21A is not equal to or larger than Y (No in S12), a job is distributed to the queue 14A of the magnetic storage unit 21A (S13).

On the other hand, when it is determined in S11 that the number of jobs piled in the queue 14B of the semiconductor storage unit 21B is not equal to or larger than X (No in S11), it is determined whether the number of jobs piled in the queue 14A of the magnetic storage unit 21A is equal to or larger than Y (S14). When it is determined in S14 that the number of jobs piled in the queue 14A of the magnetic storage unit 21A is equal to or larger than Y (Yes in S14), a job is distributed to the queue 14B of the semiconductor storage unit 21B.

On the other hand, when it is determined in S14 that the number of jobs piled in the queue 14A of the magnetic storage unit 21A is not equal to or larger than Y (No in S14), it is determined whether the length of data designated by the write command is equal to or smaller than Z (Z is a positive integer) (S15). When it is determined in S15 that the length of data designated by the write command is equal to or smaller than Z (Yes in S15), a job is distributed to the queue 14B of the semiconductor storage unit 21B (S16). On the other hand, when it is determined in S15 that the length of data designated by the write command is not equal to or smaller than Z (No in S15), a job is distributed to the queue 14A of the magnetic storage unit 21A (S13).

According to the second embodiment, it is possible to reduce the seek time in the magnetic storage unit 21A and to efficiently write the data body J2 to the magnetic storage unit 21A. Thus, it is possible to improve the response speed to an access request from the host 17.

Third Embodiment

In FIG. 1, the cache manager 13A can measure the number of accesses from the host 17, to data stored in the magnetic storage unit 21A without being stored in the semiconductor storage unit 21B and register the number of accesses in the cache management table 14C. Moreover, the data storage device 21 may write data stored in the magnetic storage unit 21A to the semiconductor storage unit 21B based on the number of accesses registered in the cache management table 14C. For example, the data stored in the magnetic storage unit 21A can be written to the semiconductor storage unit 21B when the number of accesses is 2 or more.

FIG. 6 is a diagram illustrating a method of updating a cache management table in a data storage device according to a third embodiment.

In FIG. 6, it is assumed that data has been written to the magnetic storage unit 21A based on a write command WM1 from the host 17 of FIG. 1 in which an LBA of X1 is included. In this case, in the cache management table 14C, X1 is registered in the LBA and the FPB is not designated. Moreover, in the cache management table 14C, "0" is set to a dirty flag, and "0" is registered in the number of accesses. The dirty flag "0" indicates that data has been written to the magnetic storage unit 21A regardless of whether data has been written to the semiconductor storage unit 21B.

Next, it is assumed that data has been read from the magnetic storage unit 21A only twice based on a read command from the host 17 in which an LBA of X1 is included. In this case, in the cache management table 14C, the number of accesses is incremented by only "2." Moreover, when data is read twice from the magnetic storage unit 21A, the read data is written to the semiconductor storage unit 21B. In this case, if an FPB of Y1 is allocated so as to correspond to the LBA of X1, the FPB of Y1 is registered in the cache management table 14C so as to correspond to the LBA of X1.

According to the third embodiment, when data stored in the magnetic storage unit 21A without being stored in the semiconductor storage unit 21B is read from the host 17, the data is written to the semiconductor storage unit 21B, whereby the response speed to a read command for the data from the host 17 can be improved.

Fourth Embodiment

In FIG. 1, the cache manager 13A may measure the number of accesses in response to a read command from the host 17, to data stored in the semiconductor storage unit 21B and reset the number of accesses to the data according to a write command from the host 17.

FIG. 7 is a diagram illustrating a method of updating a cache management table in a data storage device according to a fourth embodiment.

In FIG. 7, it is assumed that data has been written to the semiconductor storage unit 21B based on a write command WM2 from the host 17 of FIG. 1 in which an LBA of X2 is included. In this case, if an FPB of Y2 is allocated so as to correspond to the LBA of X2, X2 is registered in the LBA and Y2 is registered in the FPB in the cache management table 14C. Moreover, in the cache management table 14C, "1" is set to a dirty flag, and "0" is registered in the number of accesses. The dirty flag "1" indicates that data has been written to the semiconductor storage unit 21B without being written to the magnetic storage unit 21A.

Next, it is assumed that data in which an LBA of X2 is included is read from the semiconductor storage unit 21B only five times based on a read command from the host 17. In this case, in the cache management table 14C, the number of accesses is incremented by only "5." By registering the number of accesses of the semiconductor storage unit 21B on the cache management table 14C, it is possible to allow data having a larger number of accesses to be preferentially left in the semiconductor storage unit 21B and to improve the response speed to an access request from the host 17.

Next, it is assumed that a write command in which an LBA of X2 is included is issued from the host 17, and X2 is designated by the write command as the LBA. In this case, in the cache management table 14C, the number of accesses at the LBA of X2 is reset to "0," and the FPB is updated to an address that is newly allocated.

NAND flash memories have a property to deteriorate as the number of rewrites increases. According to the fourth embodiment, a larger number of accesses indicated in the cache management table 14C serve as an indicator that many effective hits have occurred with progress of deterioration in the NAND memory used as a cache. Thus, by preferentially recording data having a larger number of accesses to the cache while resetting the number of accesses to the LBA of X2 included in the write command issued from the host 17 to "0," it is possible to improve the hit rate while extending the effective working time of the cache that uses NAND flash memories.

Fifth Embodiment

In FIG. 1, the data storage device 21 may write data stored in the magnetic storage unit 21A to the semiconductor storage unit 21B and send the data to the host 17 when a read command from the host 17 is received and the length of data designated by the read command is equal to or smaller than a predetermined value. Moreover, the data storage device 21 may send the data stored in the magnetic storage unit 21A to the host 17 without writing the data to the semiconductor storage unit 21B when the length of data designated by the read command from the host 17 exceeds the predetermined value.

Figure 8A:
FIGS. 8A and 8C are diagrams illustrating a method of transferring read data from a magnetic storage unit in a data storage device according to a fifth embodiment.
Figure 8C:
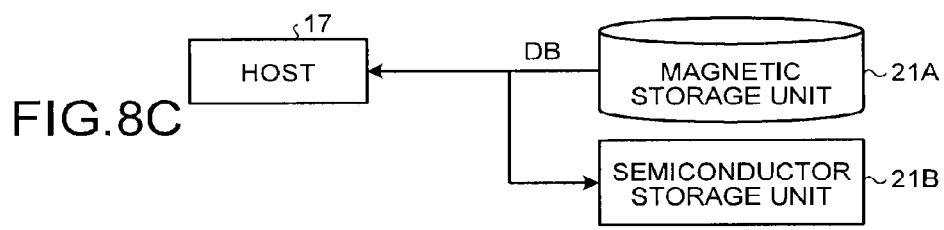

FIGS. 8A and 8C are diagrams illustrating a method of transferring read data from a magnetic storage unit in a data storage device according to a fifth embodiment, and FIGS. 8B and 8D are diagrams illustrating a method of updating a cache management table corresponding to the processes of FIGS. 8A and 8C.

In FIGS. 8A and 8B, it is assumed that data DA having a length exceeding a predetermined value is stored in the magnetic storage unit 21A without being stored in the semiconductor storage unit 21B. In this case, if the LBA of the data DA is X6, in the cache management table 14C, X6 is registered in the LBA, and the FPB is not designated. Moreover, in the cache management table 14C, "0" is set to the dirty flag, and "0" is registered in the number of accesses.

If X6 is designated as the LBA by a read command when the read command is received from the host 17, the data DA stored in the magnetic storage unit 21A is sent to the host 17 without being written to the semiconductor storage unit 21B. In this case, in the cache management table 14C, the number of accesses is incremented by only "1."

On the other hand, in FIGS. 8C and 8D, it is assumed that data DB having a length equal to or smaller than a predetermined value is stored in the magnetic storage unit 21A without being stored in the semiconductor storage unit 21B. In this case, if the LBA of the data DB is X7, in the cache management table 14C, X7 is registered in the LBA, and the FPB is not designated. Moreover, in the cache management table 14C, "0" is set to the dirty flag, and "0" is registered in the number of accesses.

Moreover, if X7 is designated as the LBA by a read command when the read command is received from the host 17, the data DB stored in the magnetic storage unit 21A is written to an area of the semiconductor storage unit 21B in which the FPB includes Y7 and is sent to the host 17. In this case, in the cache management table 14C, the number of accesses is incremented by only "1." Moreover, if the FPB of Y7 is allocated so as to correspond to the LBA of X7, in the cache management table 14C, the FPB of Y7 is registered so as to correspond to the LBA of X7.

According to the fifth embodiment, when a read command is received from the host 17, data having a length equal to or smaller than a predetermined value is written to the semiconductor storage unit 21B, and data having a length exceeding the predetermined value is not written to the semiconductor storage unit 21B. By doing so, it is possible to improve the frequency in which data having a large length is read from the magnetic storage unit 21A and data having a small length is read from the semiconductor storage unit 21B. Thus, it is possible to effectively utilize the higher write transfer rate of the magnetic storage unit 21A than the semiconductor storage unit 21B while reducing the seek time of the magnetic storage unit 21A and to improve the response speed to an access request from the host 17.

Sixth Embodiment

In FIG. 1, the data storage device 21 may write data stored in the magnetic storage unit 21A to the semiconductor storage unit 21B when no access has been made from the host 17 for a predetermined period or more and the number of accesses is a predetermined value or more.

Figures 9A, 9B:
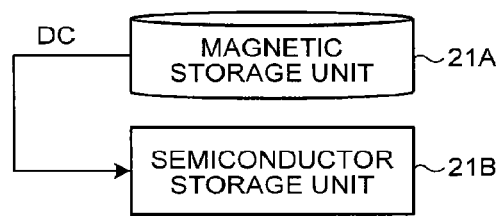
FIG. 9A is a diagram illustrating a method of writing data stored in a magnetic storage unit to a semiconductor storage unit in a data storage device according to a sixth embodiment.
FIG. 9B is a diagram illustrating a method of updating a cache management table corresponding to the process of FIG. 9A.

FIG. 9A is a diagram illustrating a method of writing data stored in a magnetic storage unit to a semiconductor storage unit in a data storage device according to a sixth embodiment, and FIG. 9B is a diagram illustrating a method of updating a cache management table corresponding to the process of FIG. 9A.

In FIGS. 9A and 9B, it is assumed that data DC is stored in the magnetic storage unit 21A without being stored in the semiconductor storage unit 21B. In this case, if the LBA of the data DC is X8, in the cache management table 14C, X8 is registered in the LBA and the FPB is not designated. Moreover, in the cache management table 14C, "0" is set to the dirty flag. Moreover, if the data DC is read only five times based on a read command from the host 17, the number of accesses of the cache management table 14C is incremented by only "5."

After that, the data DC stored in the magnetic storage unit 21A is written to the semiconductor storage unit 21B when no access has been made from the host 17 for a predetermined period or more and the number of accesses is equal to or larger than a predetermined value (for example, 5). In this case, if the FPB of Y8 is allocated so as to correspond to the LBA of X8, in the cache management table 14C, the FPB of Y8 is registered so as to correspond to the LBA of X8.

According to the sixth embodiment, the data DC stored in the magnetic storage unit 21A is written to the semiconductor storage unit 21B when no access has been made from the host 17 for a predetermined period or more and the number of accesses is equal to or larger than a predetermined value. By doing so, it is possible to improve the response speed to an access request from the host 17 while effectively utilizing the vacant period of the data storage device 21.

Seventh Embodiment

In FIG. 1, when it is notified from the host 17 that an expectation value (priority level) of an access to data designated by a write command is high, the distributor 13B may distribute the write command preferentially to the queue 14B of the semiconductor storage unit 21B.

In this manner, according to the seventh embodiment, it is possible to allow data having a higher access expectation value to be efficiently cached to the semiconductor storage unit 21B and to improve the response speed to an access request from the host 17.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data storage device comprising:
   a first storage unit;
   a second storage unit that has a lower write transfer rate and a faster response time than the first storage unit; and
   a controller configured to:
   write data stored in the first storage unit to the second storage unit and send the data to a host in a case where a length of data designated by a read command from the host is a certain length or smaller,
   send the data stored in the first storage unit to the host without writing the data to the second storage unit in a case where the length of the data designated by the read command exceeds the certain length,
   measure a number of accesses, in response to the read command, to the data not stored in the second storage unit but stored in the first storage unit, and
   write the data not stored in the second storage unit but stored in the first storage unit to the second storage unit based on the measured number of accesses.

2. The data storage device according to claim 1, wherein in response to a read command to read the data stored in both the first storage unit and the second storage unit, the controller sends the data stored in both the first storage unit and the second storage unit from the second storage unit to the host.

3. The data storage device according to claim 1, wherein the controller resets the number of accesses according to a write command from the host.

4. The data storage device according to claim 1, wherein the controller writes the data not stored in the second storage unit but stored in the first storage unit to the second storage unit in a case where no access has been made from the host for a certain period or more.

5. A data storage control method in a data storage device which includes a first storage unit, and a second storage unit that has a lower write transfer rate and a faster response time than the first storage unit, the method comprising:
   writing data stored in the first storage unit to the second storage unit and sending the data to a host in a case where a length of data designated by a read command from the host is a certain length or smaller,
   sending the data stored in the first storage unit to the host without writing the data to the second storage unit in a case where the length of the data designated by the read command exceeds the certain length,
   measuring a number of accesses, in response to the read command, to the data not stored in the second storage unit but stored in the first storage unit, and
   writing the data not stored in the second storage unit but stored in the first storage unit to the second storage unit based on the measured number of accesses.

6. The data storage control method according to claim 5 further comprising in response to a read command to read the data stored in both the first storage unit and the second storage unit, sending the data stored in both the first storage unit and the second storage unit from the second storage unit to the host.

7. The data storage control method according to claim 5, further comprising resetting the number of accesses according to a write command from the host.

8. The data storage control method according to claim 5, wherein writing the data not stored in the second storage unit but stored in the first storage unit includes writing the data not stored in the second storage unit but stored in the first storage unit to the second storage unit in a case where no access has been made from the host for a certain period or more and the number of accesses is a certain value or more.

9. A data storage device comprising:
   a first storage unit;
   a second storage unit that has a lower write transfer rate and a faster response time than the first storage unit; and
   a controller configured to:
   measure a number of accesses, in response to a read command from a host, to data stored in the first storage unit, and
   control to write the data stored in the first storage unit to the second storage unit in a case where a length of data designated by the read command is a certain length or smaller and where the measured number of accesses is a certain number or more.

* * * * *